FIG. 6

INVENTOR
JOSEPH A. CERNY

Jan. 3, 1961    J. A. CERNY    2,966,826
PROJECTILE DISPENSER FOR BLIMPS
Filed Aug. 1, 1947    10 Sheets-Sheet 9

INVENTOR
JOSEPH A. CERNY
BY
ATTORNEY

United States Patent Office 2,966,826
Patented Jan. 3, 1961

2,966,826

PROJECTILE DISPENSER FOR BLIMPS

Joseph A. Cerny, University Heights, Ohio, assignor to the United States of America as represented by the Secretary of the Navy Filed Aug. 1, 1947, Ser. No. 765,351

2 Claims. (Cl. 89—1.5)

This invention relates to bomb-carrying and releasing means for aircraft. More particularly, the invention is concerned with bomb-dispensing means adapted to be used in blimps designed for use in anti-submarine warfare.

An important anti-submarine development growing out of the recent world conflict is the stream-lined, fast-sinking anti-submarine projectile. These projectiles have been used exclusively on surface vessels and have won considerable popularity owing to the rapidity with which they may be fired and the large lethal area permitted by their use. It has been found that these projectiles, when launched in a horizontal nose-forward position, possess flight stability in air which renders them suitable for use from aircraft. A compelling consideration which recommends these projectiles for anti-submarine work is found in calculations which demonstrate that the probability of sinking a submarine with a stick of these projectiles, properly spaced, is about twice that possible with an equal weight of conventional depth charges. The present invention, therefore, is addressed to a device calculated to improve the performance of the blimp in its anti-submarine operations by adapting it to carry these streamlined anti-submarine projectiles as its principal offensive weapon.

Accordingly, an object of this invention is to provide a projectile dispensing mechanism capable of carrying a plurality of projectiles arranged in several vertical rows.

Another object of the invention is to provide such a mechanism affording both electrical and manual release for its projectiles.

An additional object of the present invention is to provide a projectile dispensing mechanism capable of releasing its projectiles in any pre-determinable time relation to one another, thus affording a measure of control over the linear spacing between the projectiles when they strike the earth.

For a better understanding of the present invention, and other objects and advantages thereof, reference may be had to the following specifications and drawings in which.

The bomb rack comprises five main assemblies: The bomb release mechanism and supporting truss, the power spring unit, the arming assembly, the forward spacer assembly and the after spacer assembly. For convenience and the clarity of presentation, these assemblies will be described individually, as will the several minor assemblies, after which they will be integrated into the whole by a discussion of the operation of the bomb rack.

Referring, therefore, first to Figs. 4, 6, 7, 8, 11, 12, and 13, for a description of the bomb release mechanism and supporting truss, it will be seen that the housing of the release mechanism is a U-shaped steel member 30 containing release hooks 31 and triggers 32 therefor. Positioned for engagement with the triggers 32 is a plurality of cams 33 mounted upon a shaft 34, the shaft being pivotally mounted in bearings 36 carried by the housing 30. Welded to the housing 30 are brackets 37 for the jack screw units 38 from which support cables 39 are hung. Interposed between the jack screws and the cables are compression spring assemblies 40 of conventional design through which loads on the bomb support cables 39 are transmitted to the brackets 37. The support cables are provided with eyes 41 at their free ends which are adapted to engage the hooks 31 while a bomb is being carried by the cables. For convenience each set of cable eyes and release hooks may be stamped with consecutive numbers designating the order in which the bombs are successively released from the rack.

Figure 6:
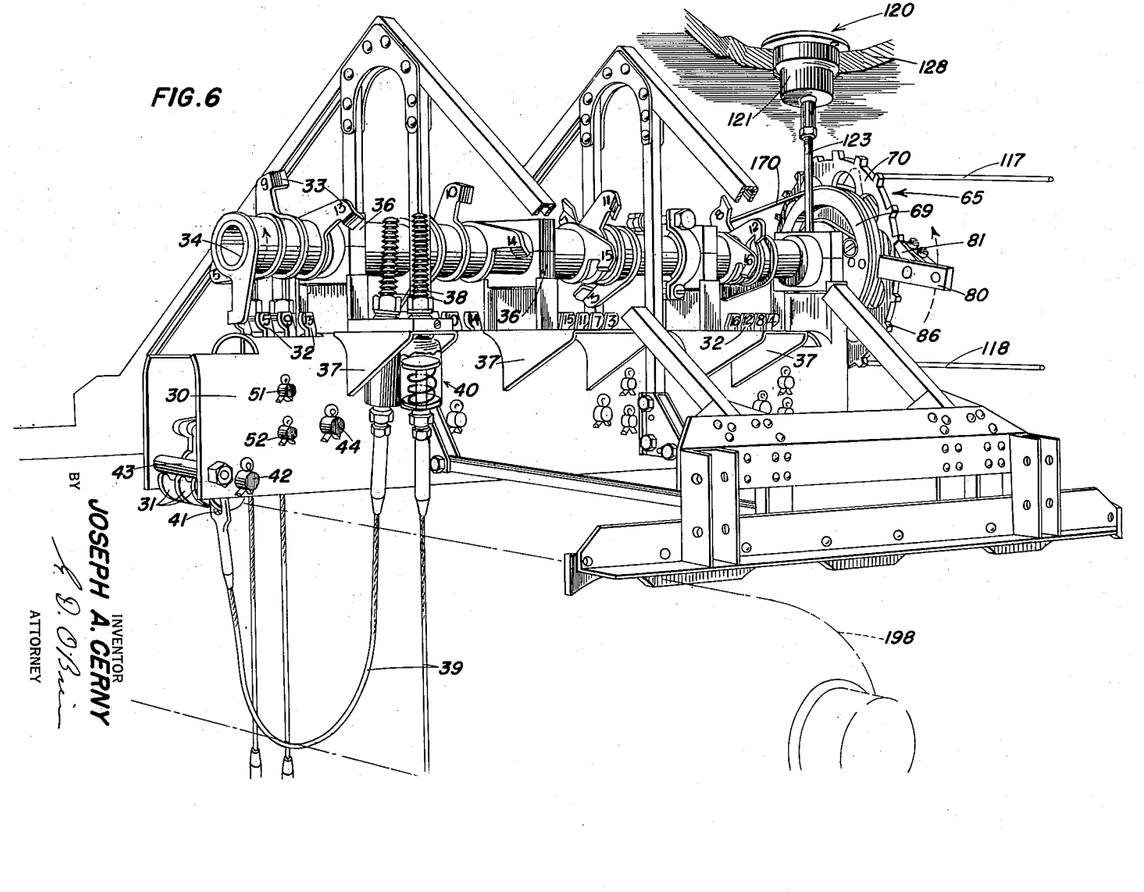
Fig. 6 is a perspective view of the supporting frame and releasing mechanism, parts of the bomb suspension means being omitted.
Figures 7, 8:
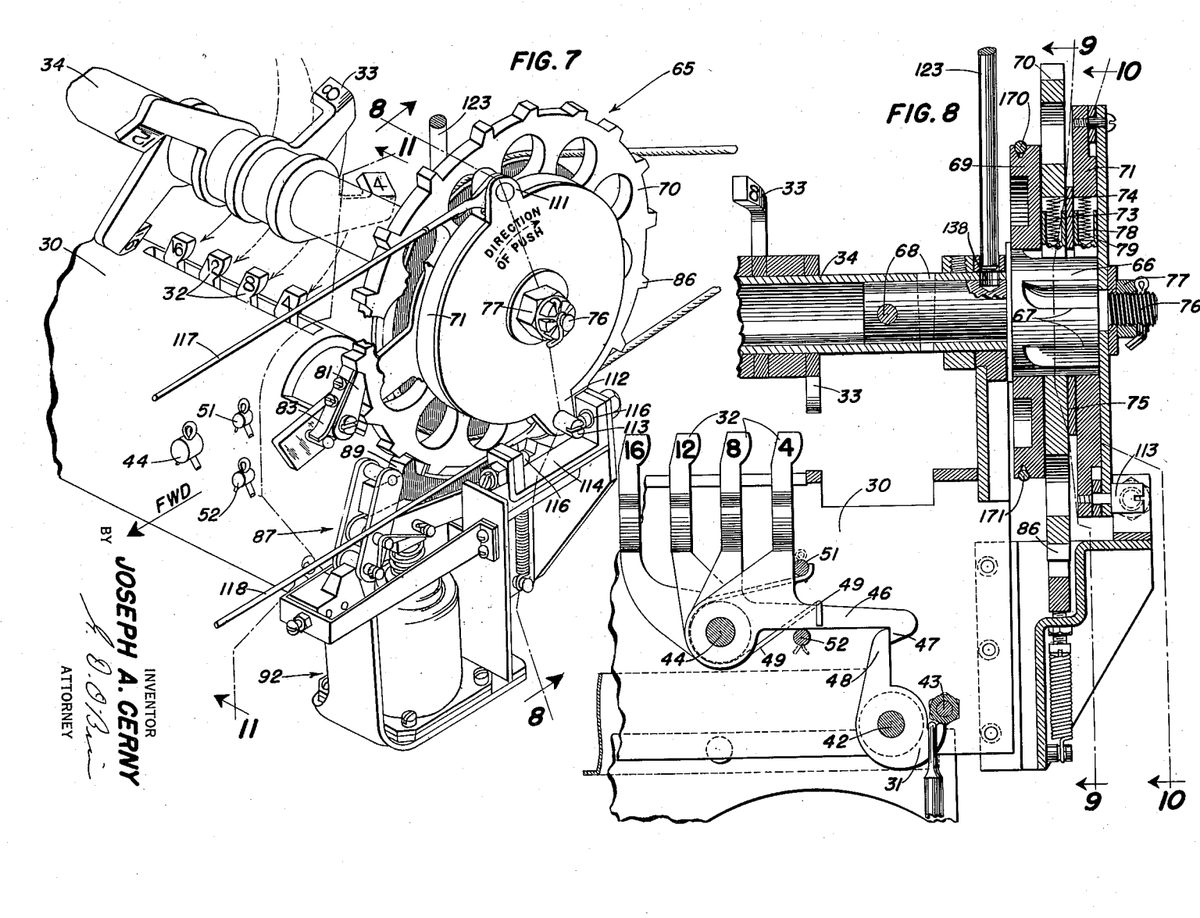
Fig. 7 is a perspective view of the release mechanism escapement.
Fig. 8 is a vertical sectional view taken substantially on the line 8—8 of Fig. 7.

Release hooks 31 are pivotally mounted upon shafts 42 which are transversely supported in the housing 30; a transverse bar 43 also carried by the housing acts as a stop to limit rotation of the hooks in one direction, and also assists in preventing eyes 41 from slipping from the hooks when the latter are in the supporting or closed position. The triggers 32, also pivoted on transversely disposed shafts, as 44, are provided with angularly disposed arms 46 having undercut portions 47 at the ends thereof adapted to engage extensions 48 of hooks 31 and thereby to restrain rotational movement of the hooks in the opposite direction. The triggers 32 are biased into restraining engagement with hooks 31 through the agency of a wire spring 49 secured at one end to a stationary transversely disposed shaft 51 and at the other end to a portion of the trigger. Movement of the triggers 32 under influence of the springs 49 is limited by a stop bar 52.

An escapement 65 is operationally attached to one end of the shaft 34 and is the agency through which motive power is transmitted from a power source, which will be described hereinafter, to the shaft. The operating mechanism comprises a driving cog 66 (Fig. 8), containing milled ratchet teeth 67, which is secured to one end of the shaft 34 and restrained against longitudinal motion therewith by tapered pins 68.

The driving cog 66 acts as a hub and carries a pulley 69, a ratchet wheel 70, and a manual drive plate 71. The pulley 69 is loose on the cog as is the ratchet wheel 70; however, the ratchet wheel is provided with a plurality of detents 73, biased radially inwardly by springs 74, and these detents are positioned for engagement with the ratchet teeth 67 of the cog to permit the ratchet wheel to rotate the cog only in one direction (clockwise in Fig. 9). The manual drive plate 71 is secured to the cog at the outer end thereof by placing it over a threaded extension 76 of the cog and bringing the parts into juxtaposition by taking up on a nut 77. A washer 75 separates the ratchet wheel 70 from the manual drive plate 71. The manual drive plate is equipped with detents 78 biased inwardly by springs 79 in the same manner as that described above for the ratchet wheel, and the detents in the manual drive plate serve the same function. Attached radially to the pulley 69 is an arm 80 which carries a dog 81 pivotally mounted thereon by pin 82. A leaf spring 83 carried by the dog and restrained in a deformed condition by a pin 84 on the arm 80 urges the dog into engagement with the teeth 86 of the ratchet wheel.

Figures 9, 10:
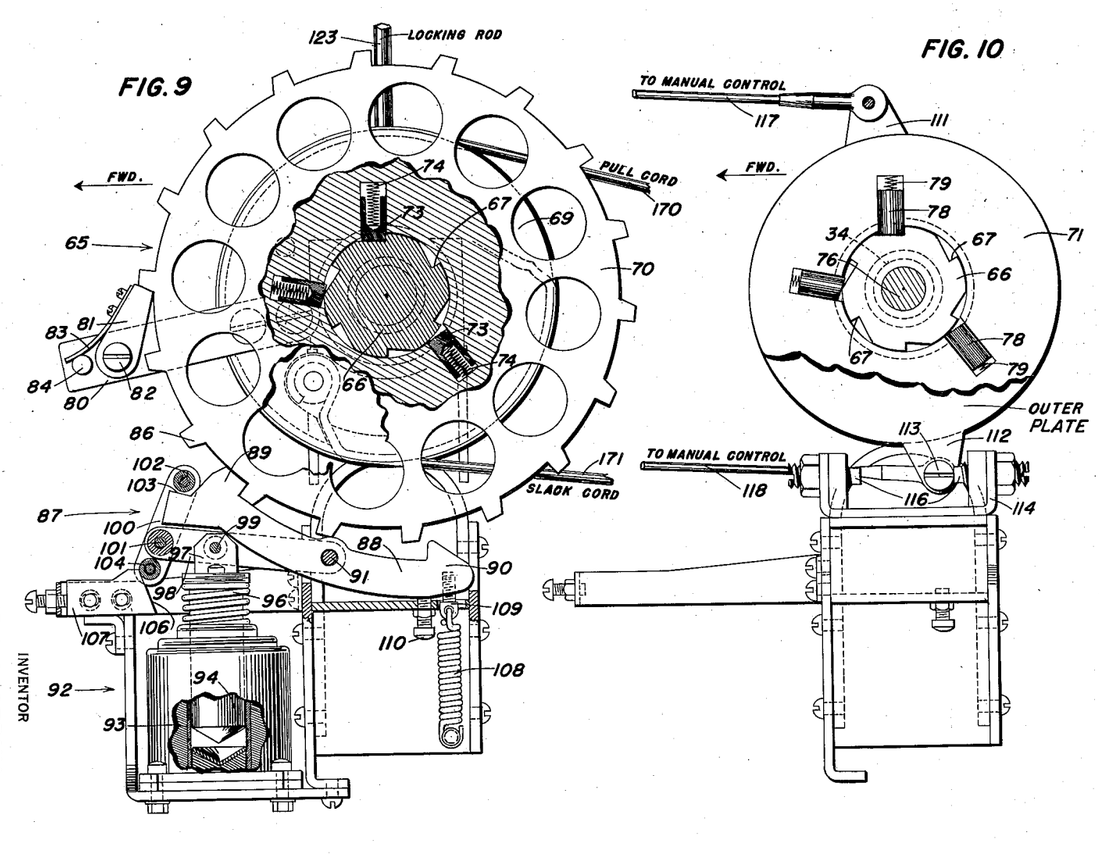
Fig. 9 is a vertical sectional view taken substantially on the line 9—9 of Fig. 8.
Fig. 10 is a detailed vertical sectional view taken substantially on the line 10—10 of Fig. 8, some of the parts already shown in Fig. 9 being omitted.
Figure 11:
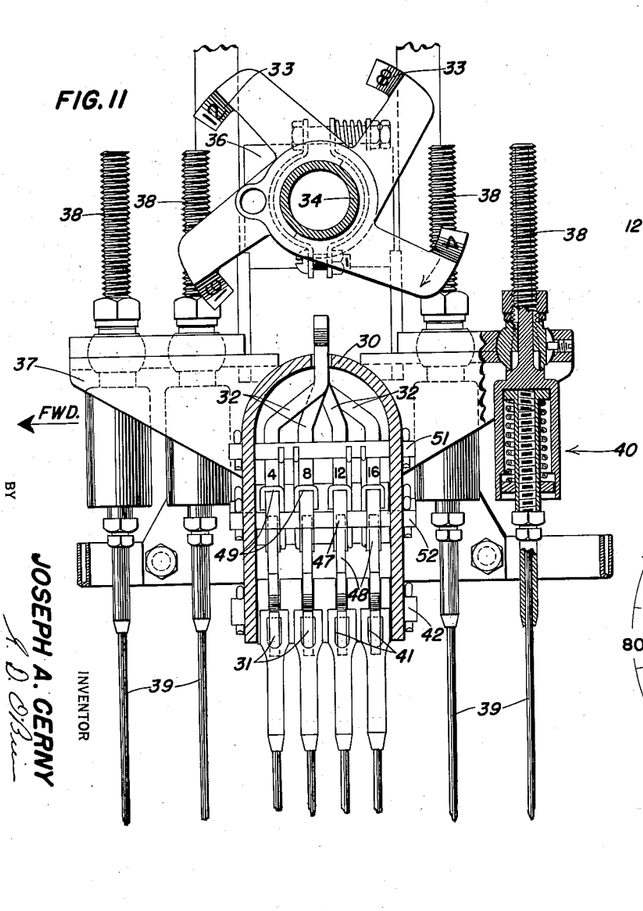
Fig. 11 is a vertical sectional view taken substantially on the line 11—11 of Fig. 7.

The escapement control is shown generally at 87 and comprises a rocker 88 provided with a shouldered appendage 89 for positive restraining engagement with the teeth 86 of ratchet wheel 70, and at the other end with a sloping surface 90 adapted to be contacted by an approaching tooth 86 to cause the rocker to rotate in a clockwise direction. The rocker is rotatably mounted on a pivot 91. Actuation of the rocker is effected electrically by a solenoid 92 having a core 93 and a plunger 94, the plunger being biased outwardly of the core by a coil spring 96. An extension 97 of the core is pivotally mounted to a link 98 by means of a pin 99. The link 98 is pivotally mounted at one end on the pin 91 and carries at the opposite end a link 100, the links being pivotally attached to one another through a pin 101. The link 100 carries a roller 102 at one end which is adapted to engage a flat surface 103 on one end of the rocker 88; at the other end of the link 100 is another roller 104 adapted to engage a sloping surface 106 of a fixed member 107. A tension spring 108 attached at one end to the rocker by means of a threaded eyelet 109 urges the rocker to the position in which the detent 89 engages a ratchet tooth 86, the limit of such motion of the rocker being adjustable by a threaded stop 110.

The manual drive plate 71 is provided with ears 111 and 112 disposed diametrically opposite each other, the ear 112 carrying a plate stop pin 113. The stop pin 113 is confined within the branches of a U-shaped fixed structure 114, the extent of its oscillatory movement being adjustably controlled by threaded stop pins 116 carried by the structure member 114. Control cables 117 and 118 are attached at one end to ears 111 and 112, respectively, and at the other to a manual release mechanism which will be hereinafter described.

Figures 12, 13:
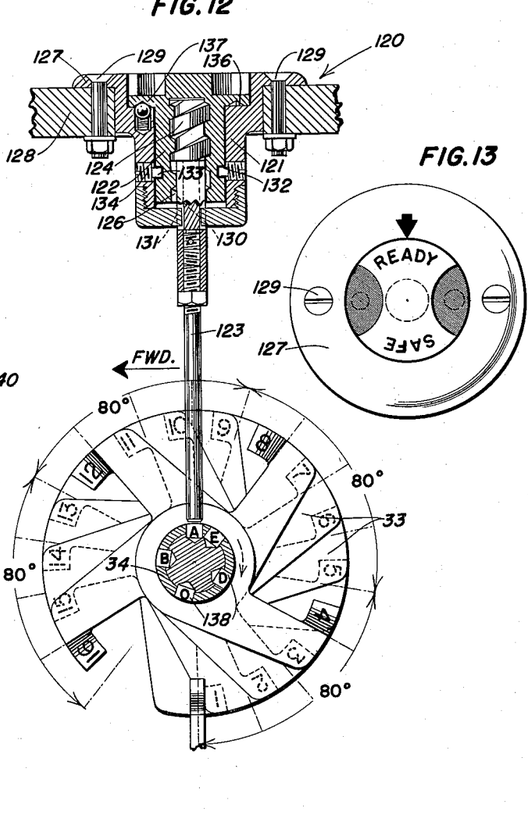
Fig. 12 is a vertical sectional view of the cam shaft locking means.
Fig. 13 is a plan view of the cam shaft locking means.

Referring now specifically to Figs. 6 and 12, there is shown a cam shaft locking means 120 which comprises essentially an external case 121 an internal head 122 loose in the case and coaxially disposed therein, and a shaft 123. The shaft is provided with threads 124 at one end thereof which threads are adapted to engage similar threads cut internally in the head 122. The casing has a flanged upper surface 127 through which the entire cam shaft locking means is fixed to the deck 128 of the aircraft as by bolts 129. The shaft 123 is grooved over a portion of its length as 130 which grooves receive a pair of tongues 131 preserved in the case in the opening (undesignated) through which the shaft 123 enters the case. The head 122 is grooved as at 132 in annular fashion to receive projection 133 of set screws 134 and thereby to prevent any longitudinal relative motion between the case 121 and the head 122. Depressions 136 in the head 122 are provided to indicate the points of highest and lowest movements of the shaft 123 within the head, the spring biased detent ball 137 lodging in the depressions at these points. Recesses 138 in the cam shaft 34 are capable of positioning in alignment with the shaft 123 and adapted to receive the end thereof when the cam locking means is in the "safe" position, whereby the cam shaft is restrained against rotational movement.

Figures 21, 22, 23, 24:
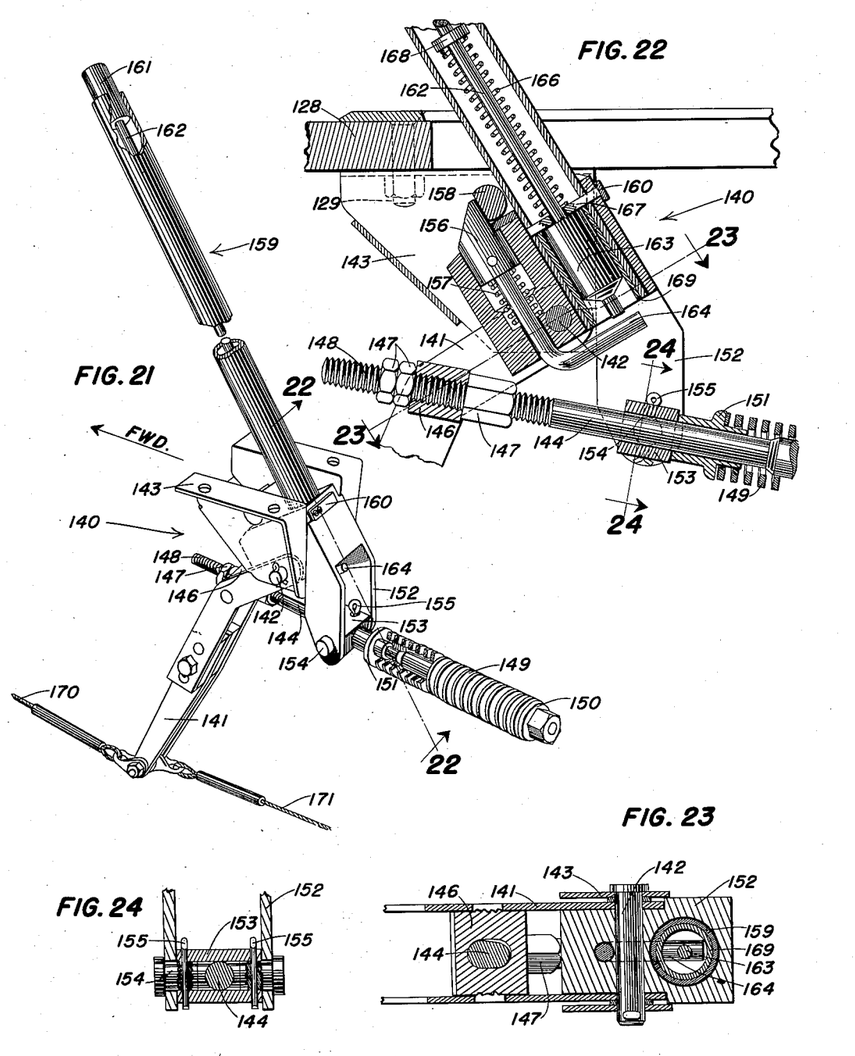
Fig. 21 is a perspective view of the power spring mechanism, some parts of which being shown in sections.
Fig. 22 is a vertical sectional view taken substantially along line 22—22 of Fig. 21, a portion of the flooring of the blimp being added.
Fig. 23 is a horizontal sectional view taken along line 23—23 of Fig. 22.
Fig. 24 is a vertical sectional view taken along line 24—24 of Fig. 23.

The power spring unit shown generally at 140 in Figs. 21 and 22 comprises an arm 141 which is rotatably mounted on a shaft 142 carried by a bracket 143 adapted to be secured to the deck 128 of the aircraft. A rod 144 is secured to a pivoted block 146 on the arm 141 by adjusting nuts 147 on a threaded portion 148 of the rod. Surrounding a portion of the rod 144 is a helical spring 149 retained on the rod at its outer end by a washer 150 and at its inner end by a shouldered sleeve 151 slidable on the rod. A lever 152, pivotally mounted on the shaft 142, carries a block 153 pivotally mounted on journals 154 and slidable on the rod 144. The journals are fixed to the block 153 by means of cotter pins 155. A latch 156 also carried by the lever 152 is biased outwardly thereof by a spring 157 in which position the latch normally engages a bar 158 carried by the bracket 143. A hollow operating handle 159, inserted in a socket in the lever 152 where it is held by a bayonet catch (undesignated) and a flat spring 160, carries a push button 161 and a push rod 162 which cooperate with a plunger 163 and a latch operating rod 164 to actuate the latch. The push button is normally biased outwardly of the handle 159 by a coiled spring 166 positioned under tension between a fixed stop 167 in the handle and a collar 168 on the rod. The tubular lining 169 reinforces the handle 159 at its lower end where it enters the socket and also serves as a guide for the plunger 163.

Figures 14, 15, 16, 17:
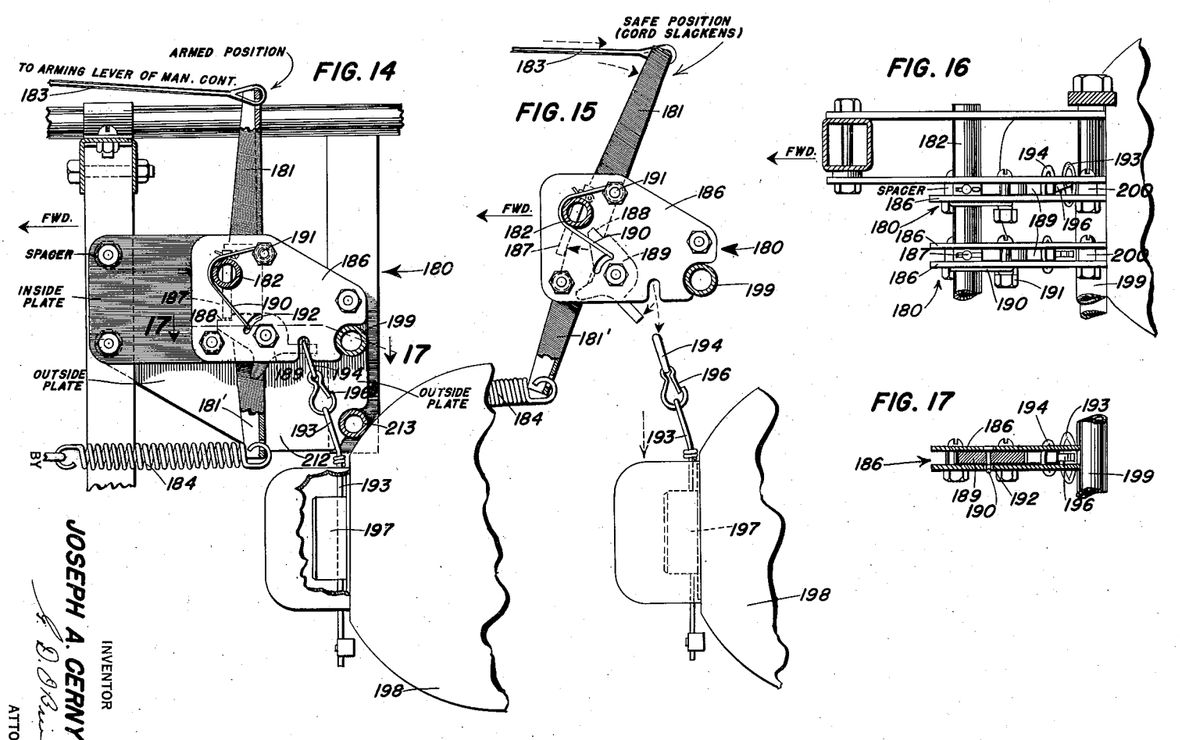
Fig. 14 is a vertical sectional view taken on line 14—14 of Fig. 5 and shows particularly the arming portion of the bomb rack.
Fig. 15 depicts the parts shown in Fig. 14 in a position to permit the dropping of bombs in the unarmed condition.
Fig. 16 is a horizontal sectional view taken along line 16—16 of Fig. 5.
Fig. 17 is a horizontal sectional view taken along line 17—17 of Fig. 14.
Figure 20:
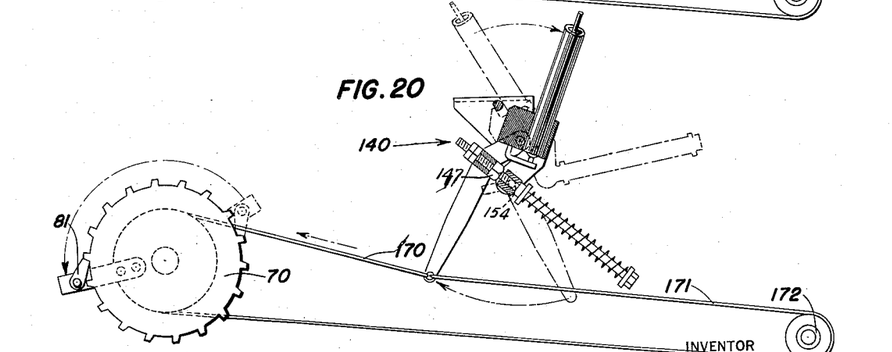

A power cable 170 and a return cable 171 are secured to the end of the arm 141 and attached to opposite sides of the pulley 69 of the operating mechanism the return cable 171 first being run over an idler pulley 172 (see Figs. 18, 19 and 20), whereby any movement of the arm 141 results in a corresponding rotational movement of the pulley 69. The arming assembly 180 is illustrated most clearly in Figs. 14 and 15, and is shown in its relation to the entire bomb releasing mechanism in Figs. 4 and 5. The arming assembly comprises a composite lever 181, 181' which is fixed to an arming rod 182 by U-bolts 185 whereby rotation of the latter is effected by movement of the lever. A control cable 183, attached to an arming control which will be hereinafter described, is the agency by which the lever is moved counterclockwise to the "armed" position; a spring 184, acting in opposition to the control cable, tends to move the lever 181, 181' in a clockwise direction to the "unarmed" position. The arming rod 182 is carried by the several bracket members 186, extending throughout the length of the arming assembly, and carries a plurality of detent members 187 which are adapted to cooperate with shoulders 188 of the several arming wire suspension hooks 189 to restrain them from counterclockwise rotation. Springs 190, which are attached at one end to posts 191 and at the other end to the hooks 189, through slots 192 in the brackets 186, bias the hooks toward the closed position. Arming wires 193, suspended from the hooks 189 by means of loops 194 and snap hooks 196, are adapted to pass through a fuze 197 of a bomb 198 in the conventional manner. A rod 199 extends the entire length of the arming assembly and rigidly supports the several bracket members to which it is welded or brazed. Spacer tubes 200 are employed to maintain the sides of the brackets parallel and properly spaced. Fig. 15 illustrates the operation of the arming wire hooks 189 when the lever 181, 181' is in the unarmed position.

Figures 1, 2, 3:
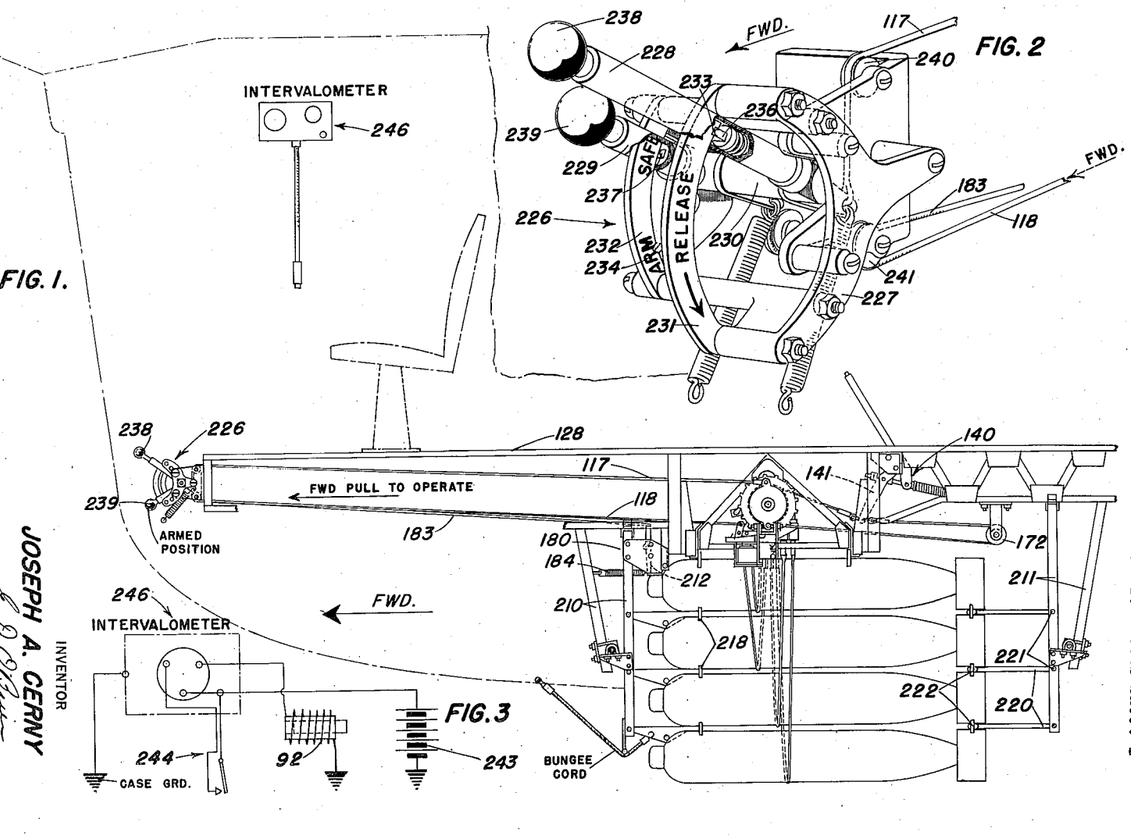
Fig. 1 is a side elevational view of a portion of a blimp provided with a bomb rack of the present invention carrying a full load of bombs.
Fig. 2 is a perspective view of a manual control employed with the bomb racks of the present invention.
Fig. 3 is a diagrammatic view of the electrical release circuit.
Figure 4:
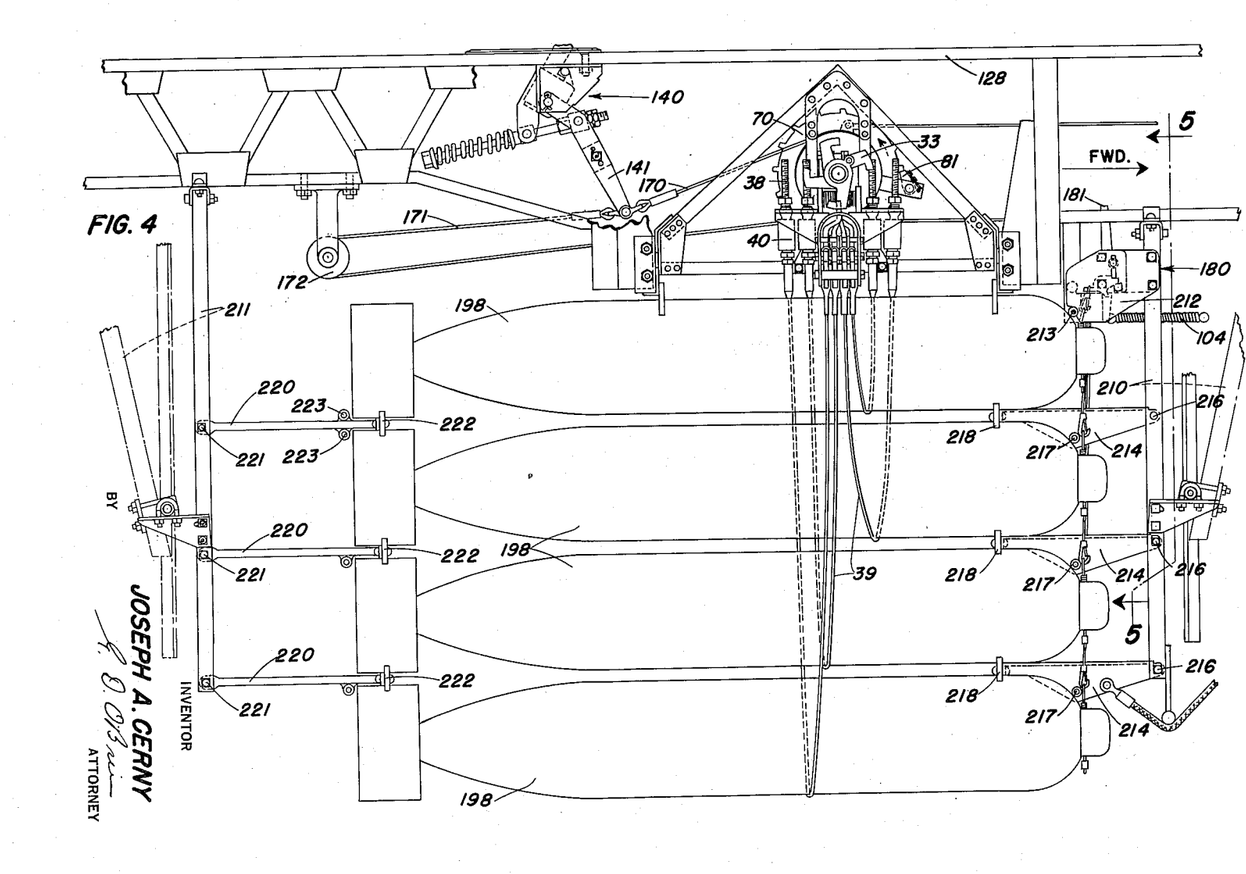
Fig. 4 is a side elevational view of the bomb rack showing the side opposite that depicted in Fig. 1.
Figure 5:
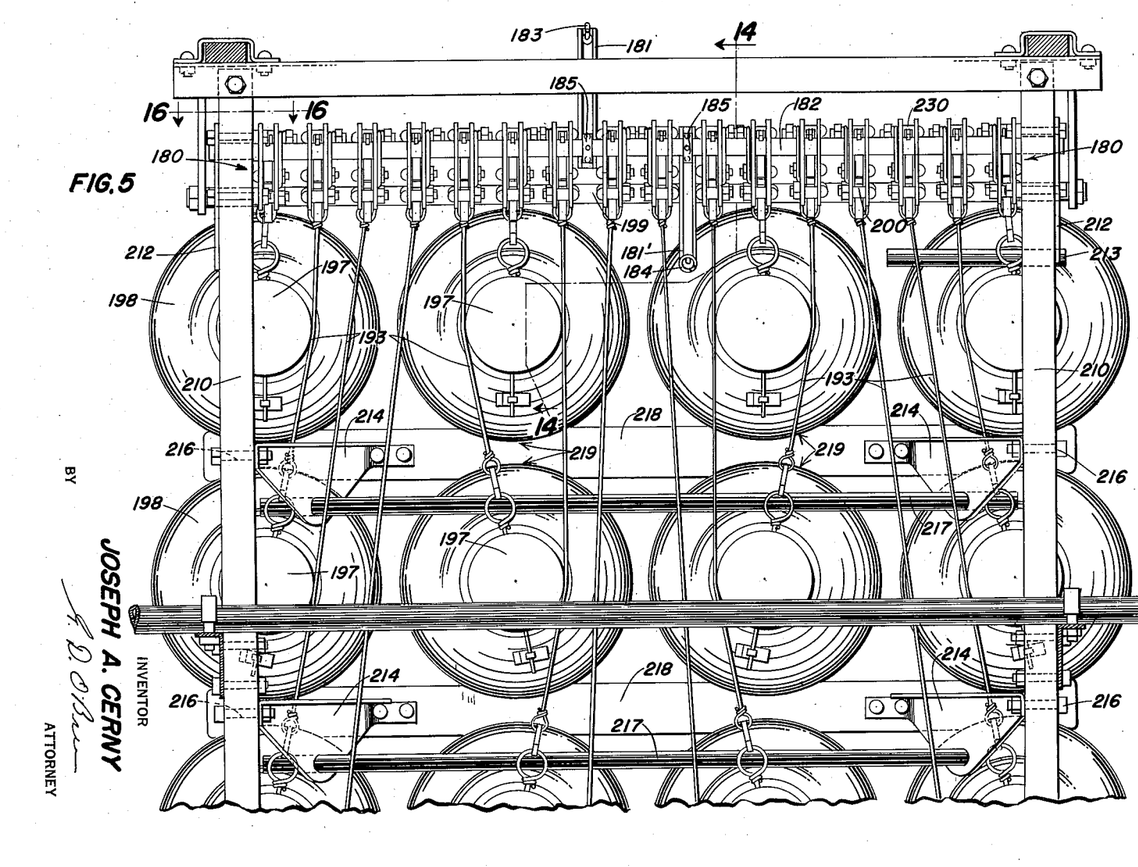
Fig. 5 is a front elevational view of the upper portion of the bomb rack, the structure appearing as seen on the line 5—5 of Fig. 4.

The forward and after spacer assemblies, which will now be described together, are shown in Figs. 1, 4 and 5, and comprise forward supporting frame members 210 and after supporting frame members 211 secured to the deck or other rigid portion of the aircraft by any convenient means. Fixed to the forward frame members are plates 212 to which is welded or otherwise secured a transverse aligning rod 213. Below the plate 212 are a plurality of brackets 214 arranged vertically on the frame 210 and pivotally mounted thereon by pins 216. Each bracket 214 carries a horizontal aligning rod 217 and, additionally, carries a spacer bar 218 which is notched, as at 219, in its upper and lower edges to follow the contour of the bombs between which it is placed.

The after spacer assembly comprises a plurality of spacer brackets 220, pivotally mounted by means of pins 221 on the after frame members 211, and carrying transversely disposed spacer bars 222 adapted to be placed between the after portions of adjacent bombs of the vertical rows in the same manner as the forward spacer bars previously described. In addition, the after spacer brackets carry aligning rods 223 which are adapted to prevent longitudinal displacement of the bombs.

The arming control and manual release mechanism are customarily incorporated in the same structure; one such conventional design is shown generally at 226 (Fig. 1). The composite assembly comprises a frame 227, a release lever 228, and an arming lever 229, the levers being pivotally mounted within the frame on a shaft 230. The frame has a pair of guide sectors 231, 232 for the release lever and arming lever, the guide sectors being notched, as at 233 and 234 respectively, to receive spring biased detents 236 and 237 carried by the levers. The handles of the levers are hollow and carry plungers 238 and 239 adapted to depress the detents against their spring pressure by the hand of the operator.

The release lever 228 is connected at its end opposite the plunger 238 to the control cables 117 and 118, which cables pass over idler pulleys 240 and 241 respectively and thence to ears 111 and 112 of the manual drive plate as previously described. In like manner, the arming lever 229 is connected to control cable 183.

The electrical release circuit depicted in Fig. 3 is conventional in form and illustrates diagrammatically the manner in which the electrical parts are connected. The solenoid 92 is connected to the power source 243 through a firing key 244 and an intervalometer 246. The intervalometer has internal connections (undesignated) which serve to space the electrical impulses to the solenoid according to a predetermined frequency.

Figures 18, 19:
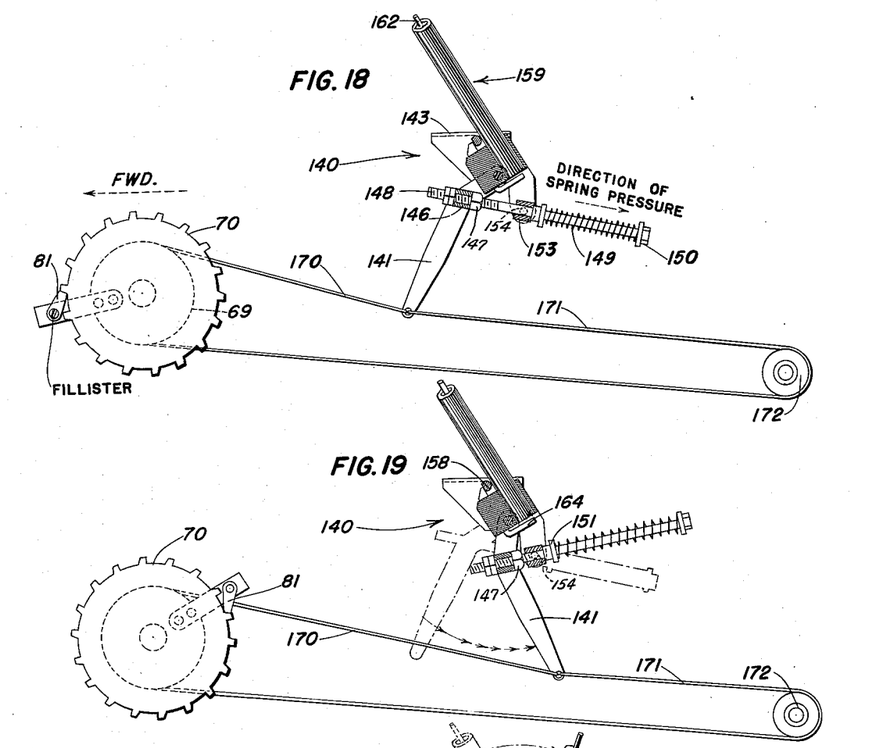
Figs. 18, 19, and 20 are a series of diagrammatic views illustrating the operation of the power spring mechanism.

The operation of the projectile dispenser is as follows. The power spring unit 140 is cocked by first moving the arm 141 from the full-line or final position to the starting or chain-line position (Fig. 19). This act advances the dog 81 to its starting position on the ratchet wheel 70 (Fig. 20) without as yet imposing any pressure on the spring 149. Up to this point the spring remains in the spent state which it progressively acquired to a low terminal value as the result of an earlier bomb-releasing cycle.

Having shifted the handle 159 in the clockwise or rearward direction to move the arm 141 to the position stated, said handle is reversed forthwith, the ensuing counterclockwise or forward shift driving the block 153 rearward on the rod 144 (Figs. 18 and 22) thereby putting the spring 149 under the maximum tension which it is expected to have. The block can be moved along the rod because the arm 141 by which the rod is carried is held in the starting position by the entrapped dog 81 and the prevention of movement of the ratchet wheel 70 by the rocker 88 (Fig. 9).

Electric impulses now delivered to the solenoid 92 according to the setting of the intervalometer 246 (Fig. 3), will repeatedly attract the rocker 88, swing it on its pivot 91 and each time release the ratchet wheel 70 for a turn to the extent of one tooth. The force that then turns the ratchet wheel, and with it the shaft 34 that activates the entire bomb-release mechanism, is the compressed spring 149.

Each expansion of said spring draws the arm 141 closer to the blocks 153. After eight increments of ratchet wheel and cam shaft rotation the nut 147 strikes the block 153, ending the movement of the arm 141 and stopping the arm 80 at the limit of its clockwise motion.

The foregoing increments of rotation are measured by the distance between the ratchet teeth. In other words, a movement of the ratchet wheel the distance of one tooth space moves the shaft 34 (Fig. 12) the distance of one cam space, so that one bomb will be released as the result. But the mechanism is organized for the release of bombs in multiples or sticks of four. Assuming the intervalometer to be set for that order of release, the electrical impulses to the solenoid 92 will come in fours so that four bombs are released in sequential order.

This order can be understood from the numbering on the ends of the cams in Fig. 12. The bomb load is sixteen, and the numbers run from 1 through 16. Cams 1, 2, 3 and 4 are individuals in cam groups one, two, three and four, and so on. The last or fourth group of cams, namely the one next to the ratchet wheel 70 (Fig. 7) will contain cams 4, 8, 12 and 16 as seen in Fig. 8.

The support cables 39 for the successive decks of bombs are progressively longer (Fig. 4), producing progressively longer slings. Thus the cables and slings for the four bombs in the top deck are shortest, those for the next deck sufficiently longer and the cables and slings for the nethermost deck the longest. The system of release, then, is to free the four bombs in the nethermost deck first, and so on up until the path is clear for the release of the bombs in the top deck.

Now, by having the longest cables under control of cams 4, 8, 12 and 16, it is readily seen that the first four impulses of the solenoid and of the ratchet wheel 70 will permit rotation of the cam shaft 34 the extent of four teeth so that the four nethermost bombs are released. This is accomplished by 80° of angular motion of the shaft 34 (Fig. 12). The same operation follows for the next decks of bombs until all have been dropped. The angular distance traversed by the cam groups is a total of 320°. The remaining 40° represents a neutral space which is not occupied by any cam.

Reverting to the act of loading the power spring unit, it can be understood that with each release of the ratchet wheel at 89 (Fig. 9), one increment of rotation is imparted to the cam shaft 34 with the effect described. The pressure of the spring 149 to the right in Fig. 18 exerts a pull on the cable 170. That pull is transmitted to the dog 81 (Fig. 9) by way of the pulley 69. The dog, in turn, applies the thrust to the ratchet wheel, and thence by way of one of the three detents 73 to the driving cog 66 of the cam shaft 34.

Should it be desired, or become necessary to operate the mechanism manually instead of electrically, successive manual manipulations of the lever 228 (Fig. 2) are delivered to the manual drive plate 71 (Fig. 10). This plate, like the ratchet wheel, has a set of detents 78 through which the driving impulses are delivered to the cam shaft 34 by way of the cog 66. When the driving impulses are derived from the detents 78, the cog 66 merely slips under the ratchet wheel detents 73 (Fig. 9) and vice versa.

A safety measure is introduced by use of the locking assembly 120 (Fig. 12). The recesses 138 are identified with the first, second, third and fourth groups of cams by the letters A, B, C and D, the neutral space between the cam groups being lettered E. The locking shaft 123 may be lowered into any one of the recesses, and when that is done the cam shaft 34 is prevented from being turned both inadvertently and by intent.

There may be an occasion wherein only one deck of bombs is desired to be released, and there might be an interval of some hours before the occasion for the release of the next deck arrives. The mechanism should then be locked so that one or more bombs may not be released by an accidental turn of the cam shaft. This act is accomplished by turning the head 122 (Fig. 12) a one-half revolution. The threaded part 124 of the locking shaft 123 responds by moving the shaft down, the indication on the surface (Fig. 13) then reading SAFE. It is apparent that the cam shaft 34 can be locked in that manner after any multiple bomb release operation.

I claim:

1. In a projectile dispenser, a shaft having means for releasing bombs in serial order, means for imparting a step motion to said shaft to produce said order of release, and an energy source for said step motion means, said source including a spring, a rod carrying the spring and having an abutment for one end of the spring, a block movable against the spring along the rod toward the abutment thereby to compress the spring, means to hold the block in the position of maximum compression of the spring so that the spring reacts against the block and tends to move the abutment away from the block, and a connection between the rod and said step motion means whereby it is actuated.

2. In a projectile dispenser, a shaft having means for releasing bombs in serial order, means for imparting a step motion to said shaft to produce said order of release, said means including a ratchet wheel and a carrier having a dog to traverse the wheel, a swingable arm having a cable connection with the dog carrier, a pivoted lever having a block, a rod pivoted at one end on the arm and sliding in the block, the other end of the rod having an abutment, a stop on the rod adjacent to its pivot on the arm, said stop being engaged by the block to receive its thrust when the lever is swung in one direction whereby said swinging of the arm advances the dog to a starting position on the ratchet wheel, and a spring on the rod between the block and the abutment undergoing compression by the block upon its departure from the stop by a swing of the lever in the opposite direction, said stop returning toward and re-engaging the block to limit the end position of the ratchet wheel under thte influence of the expanding spring.

References Cited in the file of this patent

UNITED STATES PATENTS

| | | |
|---|---|---|
| 1,675,835 | Alkan et al. | July 3, 1928 |
| 1,676,762 | Alkan et al. | July 10, 1928 |
| 2,399,530 | York et al. | Apr. 30, 1946 |
| 2,412,729 | Hall | Dec. 17, 1946 |

FOREIGN PATENTS

| | | |
|---|---|---|
| 297,156 | Great Britain | Sept. 20, 1928 |
| 411,926 | Great Britain | Apr. 26, 1934 |